Apr. 17, 1923.                                              1,451,710
                        N. PAQUETTE
                         LUBRICATOR
                       Filed Apr. 10, 1922

Inventor
Napoléon Paquette

By
Attorney

Patented Apr. 17, 1923.

1,451,710

UNITED STATES PATENT OFFICE.

NAPOLÉON PAQUETTE, OF DETROIT, MICHIGAN, ASSIGNOR OF ONE-FOURTH TO MAY C. SAMPSON, OF OTTAWA, KANSAS.

LUBRICATOR.

Application filed April 10, 1922. Serial No. 551,235.

*To all whom it may concern:*

Be it known that I, NAPOLÉON PAQUETTE, a citizen of the United States, residing at Detroit, in the county of Wayne and State of Michigan, have invented a new and useful Lubricator, of which the following is a specification.

This invention relates to lubricators, and particularly to oiling devices such as are used on spring shackles and similar bearings of motor vehicles, in which the lubricant is conducted through channeled passages to the bearing surfaces.

The principal object of the present invention is to provide for safeguarding the lubricant passages against liability to become stopped or clogged with sediment, through the provision of means to effect the clearing of the lubricant passages of any accumulated sediment automatically with each operation of filling the device with lubricant, thus facilitating and assuring the positive delivery of the lubricant to the bearing surfaces.

In attaining this object, the invention contemplates the employment in connection with a bearing spindle having a longitudinal channel communicating with an oil cup, of a rod or wire prod extending at one end into said channel and having its opposite end portion return-bent and helically coiled to form a compression spring within the oil cup, and an adjustable cap for closing said cup and compressing said spring, whereby movement of the cap in opening and closing the cup causes movement of the spring and a resultant movement of the wire prod longitudinally of the channel which tends to prevent clogging of the latter.

A preferred embodiment of the invention is illustrated in the accompanying drawing, in which, Fig. 1 is a view in elevation of a bearing spindle equipped with the lubricator embodying my invention.

Figure 1:
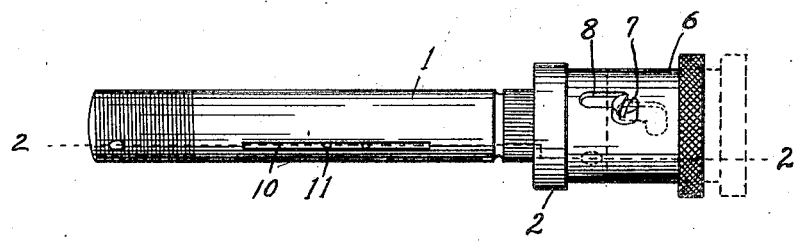
Figure 2:
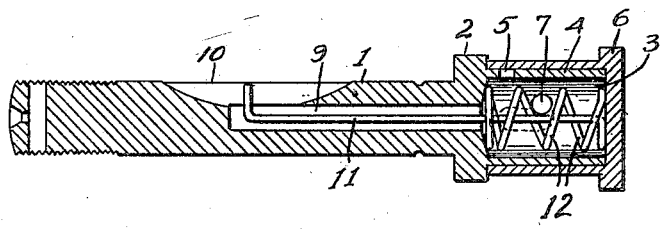
Fig. 2 is a longitudinal sectional view on dashed lines 2—2 of Fig. 1.

Referring to the drawings, 1 indicates a bearing shaft or spindle having an enlarged shouldered extension 2 at one end, in which an axial bore 3 forms the chamber of an oil retaining cup 4. The wall of the cup 4 adjacent the shoulder 2 is provided with an oil inlet opening 5 and this opening as well as the outer end of the cup is normally closed by a sleeved cap 6 which freely embraces the cup 4 abutting at its capped end against the outer end of said cup. The cap is retained against disengagement with the cup but is permitted to be moved rotatively and longitudinally thereof to uncover the oil inlet opening by means of a stud or screw 7 anchored in the wall of the cup and engaging with a right-angled slot 8 in the sleeve of the cap in the manner of an ordinary "bayonet lock."

Figure 3:
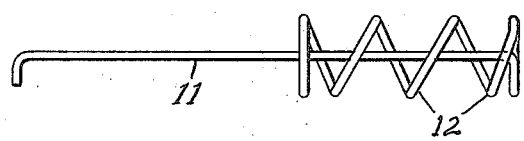
Fig. 3 is an enlarged view in elevation of the integrally formed wire prod and actuating coiled spring.

The body of the spindle is formed with a longitudinal oil communicating channel or passage 9 which communicates at one end with the oil cup 4, and at its opposite end with the surface of the spindle through a radial slot 10, and extending through said passage is a wire prod 11, one end of which is bent laterally to engage in said slot and the opposite end of said wire is return-bent relative to the body portion and helically coiled to form a compression spring, as shown in Fig. 3. The inner free end of the spring seats upon the bottom of the oil cup, and the outer end of said spring and prod abut against the inner face of the cap 6.

The length of the spring is somewhat greater than the depth of the oil cup, hence when the cap is in its normally closed position, as shown, the spring is compressed and the prod correspondingly extended longitudinally of the passage and slot to the limit of its inward movement. In this position a partial rotation of the cap, such as to engage the angular portion at the outer end of the slot 8 with the screw 7, will lock said cap against outward movement by the influence of the spring. A reverse rotative movement of the cap will release it to undergo outward movement limited by engagement of the inner end of said slot with said screw, as indicated by dotted lines in Fig. 1, in which position the oil inlet opening will be uncovered and the expansive action of the spring will have shifted the wire prod in a corresponding direction and distance in the oil conducting passage.

It will be clear from the foregoing that upon each operation of unscrewing the oil inlet opening to introduce oil to the cup and upon closing said opening through manipulation of the cap, movement will automatically be imparted to the wire prod in a manner tending to prevent clogging of the oil passages, and to facilitate feeding of the oil to the bearing surfaces.

What I claim is:

1. A lubricator comprising an oil cup having an outlet passage, a closure for said cup movable longitudinally thereof, a wire prod extending at one end through said passage and resiliently formed at its opposite end and stressed between said cup and closure, and means retaining said closure movably engaged with said cup.

2. A lubricator comprising an oil cup having an outlet passage, a closure for said cup movable thereon, a wire prod extending at one end through said passage and having its opposite end helically coiled and embraced between said cup and closure, and means releasably retaining said closure in limited positions of movement.

In testimony whereof I sign this specification.

NAPOLÉON PAQUETTE.